(12) United States Patent
Banner

(10) Patent No.: US 9,122,434 B2
(45) Date of Patent: Sep. 1, 2015

(54) SYSTEM AND METHOD FOR PRIORITIZING PRINT JOBS IN A BATCH

(75) Inventor: Ron Banner, Yokneam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 14/126,706

(22) PCT Filed: Aug. 31, 2011

(86) PCT No.: PCT/US2011/050062
§ 371 (c)(1),
(2), (4) Date: Dec. 16, 2013

(87) PCT Pub. No.: WO2013/032469
PCT Pub. Date: Mar. 7, 2013

(65) Prior Publication Data
US 2014/0160527 A1 Jun. 12, 2014

(51) Int. Cl.
*G06F 3/12* (2006.01)
(52) U.S. Cl.
CPC .......... *G06F 3/1275* (2013.01); *G06F 3/1203* (2013.01); *G06F 3/1204* (2013.01); *G06F 3/1211* (2013.01); *G06F 3/1262* (2013.01); *G06F 3/1263* (2013.01); *G06F 3/1282* (2013.01); *G06F 3/1285* (2013.01)

(58) Field of Classification Search
None
See application file for complete search history.

(56) References Cited

U.S. PATENT DOCUMENTS

| | | |
|---|---|---|
| 6,805,502 B2 | 10/2004 | Rai et al. |
| 7,542,161 B2 | 6/2009 | Lin et al. |
| 7,577,554 B2 | 8/2009 | Lystad et al. |
| 7,751,079 B2 | 7/2010 | D'Entrecasteaux |
| 2008/0144084 A1 | 6/2008 | Rai |
| 2009/0015860 A1 | 1/2009 | Jahn et al. |
| 2009/0025000 A1 | 1/2009 | Rai |
| 2009/0279123 A1 | 11/2009 | Sekiine |
| 2011/0002004 A1 | 1/2011 | Rai et al. |
| 2011/0063654 A1 | 3/2011 | Simske |

*Primary Examiner* — Saeid Ebrahimi Dehkord
*Assistant Examiner* — Lennin Rodriguezgonzale
(74) *Attorney, Agent, or Firm* — Fletcher Yoder

(57) ABSTRACT

Systems and methods for prioritizing print jobs of different families within a print job batch are provided. Such a system may include, for example, an input/output port and a processor. The input/output port may output a print job batch including at least one print job of a first family and at least one print job of a second family. The processor configured may determine the order of priority of the print job batch based at least in part on a first trend of expected differences in setup times between print machines when the first family is prioritized before the second family and a second trend when the second family is prioritized before the first family.

20 Claims, 4 Drawing Sheets

SYSTEM AND METHOD FOR PRIORITIZING PRINT JOBS IN A BATCH

BACKGROUND

Despite the onset of the "electronic age," there is still significant demand for print products. Indeed, annual commercial print retail sales may total more than $700 billion. Print service providers (PSPs) fulfill the demand for print products by printing a vast array of print products, such as photographs and brochures, school course materials, periodicals and books, and advertisements and product packaging.

Commercial printing in a PSP is often characterized by high variety. That is, the flow of print jobs in the PSP may be jumbled, setups are common on the various print machines of the PSP, and the environment may have an atmosphere more reminiscent of project work than a systematic manufacturing process. Processing a print job generally involves four main stages of production: pre-press, press, post-press, and shipping. A PSP may determine a production workflow to complete these stages to process a print job to completion using various print machines and stations on its production floor. In some cases, several print jobs may be processed together in a batch. Batching print jobs together can, at times, result in more efficient print job processing than printing the batched jobs separately. At other times, however, batching the print jobs together may result in less efficient print job processing than printing each print job separately. It may be difficult for a PSP manager to discern when and how to batch print jobs to the greatest effect.

DETAILED DESCRIPTION

The present disclosure relates to determining an optimal print job priority of print job families in a print job batch. According to the present disclosure, a print service provider (PSP) may determine digital commercial print workflows by batching print jobs of different families. Specifically, by properly selecting the priority of the print job families within a print job batch. the PSP may process the print job batch more efficiently. Thus, it may be cheaper or faster to process print jobs in a batch rather than to process them individually.

Some print job batches may include print jobs of only a single family. As used herein, the term "family" refers to a type of print job for which no additional setup time is required on a print machine that immediately previously processed another print job of that "family." On the other hand, some batches may include print jobs of more than one family. In addition, a batch may be "splittable." As used herein, the term "splittable" refers a print job batch in which some print jobs of the batch may be delivered to a subsequent print machine for processing before the current print machine has finished processing all print jobs of the batch. When a batch composed of multiple job families are formed, the order of priority in which the print jobs of such a batch are scheduled could impact the total amount of time used to complete the print jobs of the batch. By prioritizing the order print job families appear in a splittable print job batch, the print job batch may be more efficiently processed through the PSP.

Technical effects of the present disclosure thus include, among other things, more efficient commercial printing. Print job batches having print jobs of different families may be prioritized in an optimal manner. Print job batches thus may be printed in less time, allowing the PSP complete more print jobs than otherwise in the same amount of time.

Figure 1:
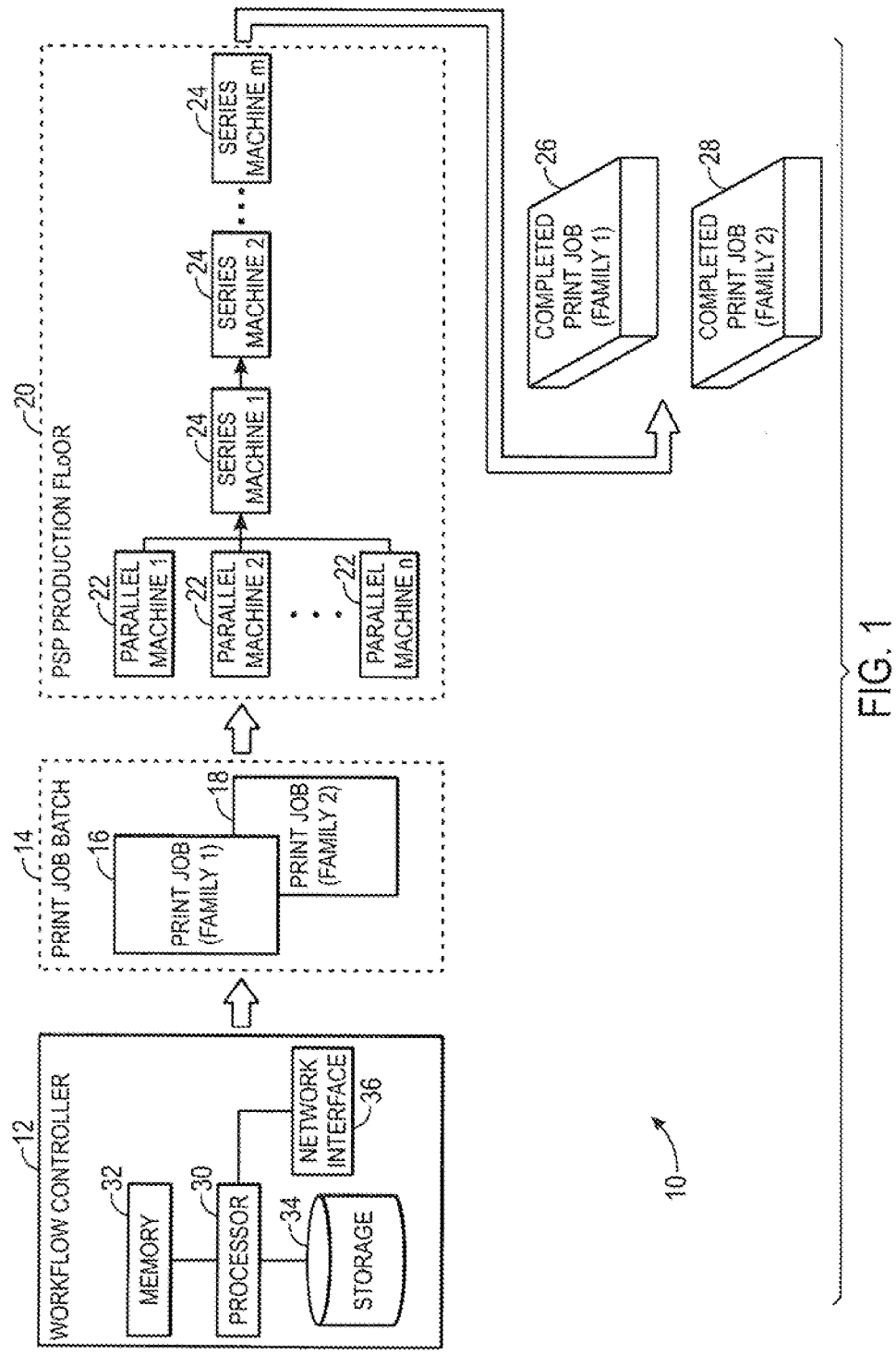
FIG. 1 is a block diagram of a print job batching system, in accordance with an embodiment.

For example, in a printing system 10 shown in FIG. 1, a workflow controller 12 may determine the priority of a print job batch 14 that includes at least two print jobs of different families. In the example of FIG. 1, the print job batch 14 includes a print job 16 of a first family and a print job 18 of a second family. The print job batch 14 may be scheduled to be processed by various machines and/or stations of a print service provider (PSP) production floor 20.

The PSP machines 20 may be modeled as a collection of parallel machines 22 followed by serial machines 24. The PSP machines 20 may include, as generally illustrated, n parallel machines 22 followed by m series machines 24. By way of example, the parallel machines 22 generally may include digital or non-digital printing presses that can process print jobs in parallel. The serial machines 24 generally may represent finishing machines, such as collating machines, trimming machines, binding machines, and so forth. The m serial machines 24 of the PSP production floor 20 also generally may include processing elements that are not strictly "machines," but rather may be stations where workers of the PSP perform specified tasks on print jobs passing through. As will be discussed below, the workflow controller 12 may prioritize the print job batch 14 (e.g., print job 16 before print job 18) according to the manner described in greater detail below. As such, the print job batch 14 may be processed on the PSP production floor 20 according to a schedule developed by the workflow controller 12. For example, the print jobs 16 and 18 of the print job batch 14 may be completed as completed print jobs 26 and 28, respectively.

The workflow controller 12 may represent any suitable electronic device, such as a computer system, capable of prioritizing the print job batch according to the manner described herein. The various functional blocks illustrated in the workflow controller 12 of FIG. 1 may include hardware elements, processor-executable instructions, or a combination of both. The blocks of the workflow controller 12 are intended to represent only an example of the kind of components that may appear in an implementation of the workflow controller 12. Indeed, an actual implementation of the workflow controller 12 may have more or fewer components. By way of example, the workflow controller 12 may be a model of an HP server, desktop, or notebook computer.

In the workflow controller 12, processor(s) 30 and/or other data processing circuitry may be operably coupled to memory 32 and storage 34 to execute instructions for carrying out the presently disclosed techniques. These instructions may be encoded in programs that can be executed by the processor(s) 30. The instructions may be stored in any suitable article of manufacturer that includes at least one tangible, computer-readable medium that at least collectively stores these instructions or routines (e.g., the memory 32 or the storage 34). The memory 32 and/or the storage 34 may include, for example, random-access memory, read-only memory, rewriteable memory, a hard drive, and/or optical discs.

Input/output (I/O) ports, such as a network interface 36, may allow the workflow controller 12 to communicate the print job batch 14 and/or the scheduling of the print job batch 14 to the PSP production floor 20. The network interface 36 may provide communication via, for example, a personal area network (PAN), such as Bluetooth; a local area network (LAN), such as Wi-Fi; a wide area network (WAN), such as a 3G, WiMax, or LTE network; and/or other suitable communication protocols. As should be appreciated, the workflow controller 12 may include a variety of other components, such as a power supply, a keyboard, a mouse, a track pad, a display, and/or a touch screen interface, and so forth. By way of example, the workflow controller 12 may be, or may be associated with, a manufacturing execution system (MES) used by the PSP to control how the print job batch 14 is scheduled through the PSP production floor 20.

In general, the workflow controller 12 may determine which of the print machines 22 and 24 through which the print job batch 14 is to be processed. In the example of FIG. 1, the print job batch 14 includes the print job 16 of the first family and the print job 18 of the second family, but in general may include any suitable number of print jobs of any suitable number of families. Also, the print job batch 14 may be understood to be "splittable," in that processing the print jobs of the print job batch 14 (on at least one of the print machines or stations 22 or 24 of the PSP production floor 20) may begin processing on a subsequent machine before the current machine has completed the entire print job batch 14. For example, after a particular machine or station 22 or 24 of the PSP production floor 20 has processed the print job 16 but before the processing of the print job 18 has completed, the print job 16 may begin to be processed by a subsequent machine or station 24.

Moreover, as mentioned above, after a print machine or station 22 or 24 ($M_i$) of the PSP production floor 20 has been set up to process a print job of a particular family, subsequent setup times for other print jobs of the same family may be essentially negligible. The family setup time on a given machine $M_i$, when a print job family g is immediately preceded by a print job family f, may be defined as $s_{i,f,g}$. It is not necessarily true that a setup time from a print job family g to a print job family f (e.g., $s_{i,f,g}$) would be the same as the setup time from a print family f to a print family g (e.g., $s_{i,f,g}$). Indeed, the order in which print job families are processed through a machine $M_i$ may influence the total amount of processing time involved to process a print job batch (e.g., the print job batch 14). Thus, the order of priority in which print jobs of different families are ordered in a batch of print jobs could impact the efficiency of the printing system 10.

Considering the example of FIG. 1, the workflow controller 12 has determined that the print job batch 14 will be processed more efficiently through the PSP production floor 20 when the first print job 16 of the first family is processed before the second print job 18 of the second family. One manner in which the workflow controller 12 may determine the priority of print job families appears in a flowchart 40 of FIG. 2. Namely, the workflow controller 12 or any other suitable data processing system, either onsite or offsite from the PSP, may determine to process any suitable number of print jobs (e.g., 16 and 18) together in a print job batch (e.g., 14). It should be understood that such a print job batch may include only single print jobs of different families (e.g., the print job 16 of the first family and the print job 18 of the second family) or may include at least one sub-batch including more than one print job of the same family.

The flowchart 40 may begin when the workflow controller 12 or any other suitable data processing system defines at least two artificial jobs, each formed of print jobs present in a print job batch (e.g., the print job batch 14) of at least two families of print jobs (block 42). The present disclosure refers to an "artificial job" to mean a hypothetical print job that would result if print jobs of multiple families (e.g., the print job batch 14) were combined and processed as a single job through the PSP production floor 20. Consider, for instance, the print job batch 14 of the example of FIG. 1. To account for every permutation of the print job families of the print job batch 14, the workflow controller 12 may define two artificial jobs. One of these two artificial jobs may prioritize the print job 16 before the print job 18. The other of the two artificial jobs may prioritize the print job 18 before the print job 16. Although this example results in only two artificial jobs, it may be appreciated that for print job batches 14 that include print jobs of more than two print job families, additional artificial jobs may be defined accordingly. That is, when a print job batch 14 includes print jobs of more than two print job families, the workflow controller 12 may define other artificial jobs to account for all other permutations.

The setup times involved for different print machines 22 or 24 could vary depending on the order in which the print job families appear in the artificial job. These differences in setup times of the various print machines 22 and 24 may be used by the workflow controller 12 to determine an order of priority of the families in the ultimate print job batch 14 that will actually be processed on the PSP production floor 20. Specifically, the workflow controller 12 first may determine the differences in setup times moving from each machine $M_i$ to a next machine $M_{i+1}$ in the workflow, referred to in this disclosure as $\Delta(_j)i$. It may be understood that $T_j=(\Delta_1, \Delta_2, \ldots, \Delta|_M|)$ can represent a vector indicating the processing time of each machine for a first print job j of an artificial job. Each element in the vector $T_j$ represents the processing time for the $i^{th}$ machine m in the workflow through which the artificial job is hypothetically scheduled. A trend in the vector $T_j$ may indicate the extent to which the processing times on upstream print machines of the workflow of the artificial job process the artificial job relative to the more downstream print machines. These setup time differences $\Delta(_j)m$ may be determined by the workflow controller 12 based on data located in the storage 34 of the workflow controller 12 or from an external database. Such data may generally indicate setup times for each machine or station 22 or 24 of the PSP production floor 20 when being set up for use from one family to another. The data may include, for example, data to enable the workflow controller 12 to model the workflow of the artificial job through the PSP production floor 20. In some cases, the data may represent modeled or experimental setup and/or processing results, statistics relating to historical setup and/or processing times of the PSP production floor 20 machines or stations 22 or 24, manufacturer data, and so forth.

The workflow controller 12 may consider the points $(1, \Delta_1), (2, \Delta_2), \ldots (|M|, \Delta_{|M|}) \in \mathbb{Z} \times \mathbb{R}$, representing the setup time differences from one print machine or station 22 or 24 to a next print machine or station 22 or 24, from which a best fit line may be determined for each artificial job (block 46). This best fit line may be determined using any suitable technique, such as linear regression. The slope of the best fit line generally corresponds to the extent to which the processing times on upstream print machines of the workflow of the artificial job process the artificial job relative to the more downstream print machines. The workflow controller 12 may use the slope of the best fit line to determine a print job batch 14 family priority (block 48). More particularly, the priority used in an artificial job with a best fit line of relatively larger slope is believed to be more efficient than a priority used in an artificial job with a best fit line of relatively smaller slope. Additionally or alternatively, the workflow controller 12 may rely on a trend generally occurring in the vectors $T_j$ of the artificial jobs, which may similarly indicate the preferred order of priority. That is, the vector $T_j$ associated with an artificial job that generally increases more quickly may be understood to represent a preferred order of priority.

Figure 2:
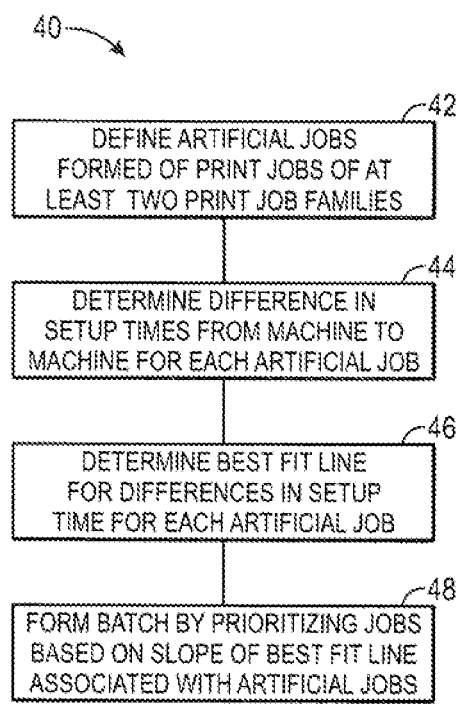
FIG. 2 is a flowchart describing a method for prioritizing print job order in a batch with at least two print job families by simulating at least two artificial jobs, in accordance with an embodiment.
Figure 3:
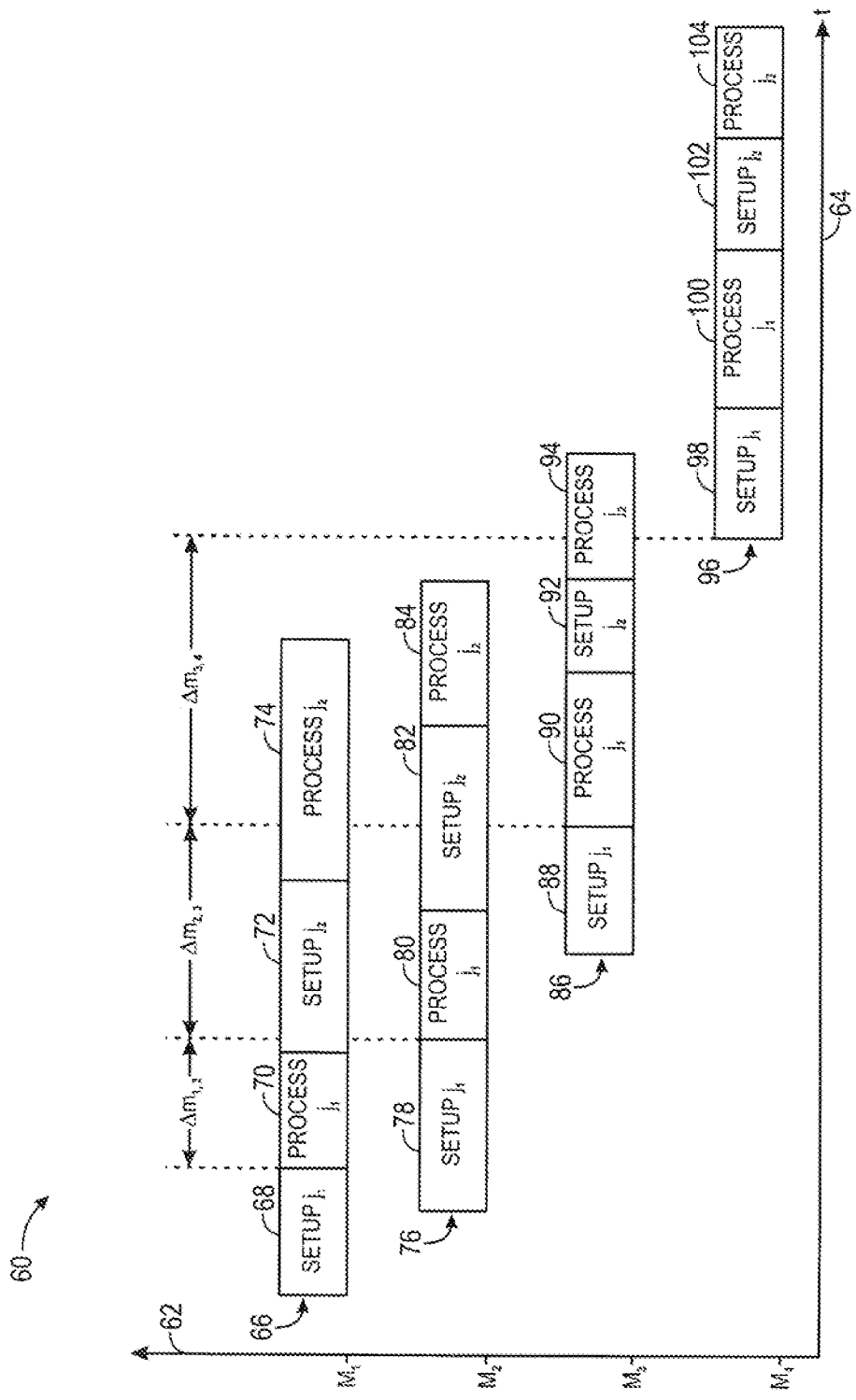
FIG. 3 is a timing diagram representing setup time differences in processing an artificial job from one operation to the next, in accordance with an embodiment.

One example of the method of FIG. 2 is described with reference to FIGS. 3, 4, and 5. Turning first to FIG. 3, a plot 60 represents one manner of determining the differences in setup times from one print machine $M_i$ to another print machine $M_{i+1}$ for one artificial job composed of two print jobs of different families (e.g., the print job 16 of the first family and the print job 18 of the second family). An ordinate 62 of the plot 60 represents setup and processing times for four print machines $M_1$, $M_2$, $M_3$, and $M_4$, and an abscissa 64 represents time t. The plot 60 illustrates setup and processing times associated with only one artificial job composed of only two constituent jobs, $j_1$ and $j_2$, of different respective families and in that order of priority. However, it should be appreciated that the workflow controller 12 or other data processing system considers other artificial job configurations (e.g., $j_2$ before $j_1$). Moreover, though only four print machines $M_1$, $M_2$, $M_3$, and $M_4$ appear in the plot 60 of FIG. 3 to simplify discussion, the workflow controller 12 or other data processing system may consider any suitable number of the print machines or stations 22 or 24 that would in practice be used to process the print jobs that form the artificial print job.

In the plot 60, a total processing time 66 for the artificial job on a first print machine is shown to include a setup time 68 and a processing time 70 for the first print job $j_1$ and a setup time 72 and for a processing time 74 for the second print job $j_2$ of the artificial job, in the example of the plot 60 of FIG. 3, the artificial job being processed through the workflow is splittable. Therefore, the print job $j_1$ can begin to be processed by the print machine $M_2$ after being processed by the previous machine $M_1$, even if the previous print machine $M_1$ is still has yet to finish processing the second print job $j_2$.

Thus, in a total processing time 76 of the artificial job, the print job $j_1$ may begin to be processed on the print machine $M_2$ before the total processing time 66 of the artificial job has completed for print machine $M_1$. The total processing time 76 of the artificial job on the print machine $M_2$ may include a setup time 78 and processing time 80 for the first print job $j_1$ and a setup time 82 and processing time 84 for the second print job $j_2$ of the artificial job. Although the setup time 76 may begin before the processing time 70 has completed, the processing time 78 will not begin until after the processing time 70 has ended. Likewise, a total processing time 86 of the artificial job on the print machine may include a setup time 88 and processing time 90 for the first print job $j_1$ and a setup time 92 and processing time 94 for the second print job $j_2$ of the artificial job.

Though the artificial job is simulated as splittable, processing on some print machines may not begin until the entire artificial job has completed. For example, in the plot 60 of FIG. 3, processing on the print machine $M_4$ does not begin until processing on the print machine $M_3$ has completed. As seen in the plot 60, a total processing time 96 of the artificial job on the print machine $M_4$ may include a setup time 98 and processing time 100 for the first print job $j_1$ and a setup time 102 and processing time 104 for the second print job $j_2$ of the artificial job. In the case of the print machine $M_4$, the setup time 98 does not begin until the processing time 94 has completed.

As discussed above, differences in setup times from one print machine to the next may vary depending on the order in which print job families are prioritized. Thus, setup time differences may be determined for each artificial job. For example, in FIG. 3, a setup time difference $\Delta m_{1,2}$ occurs between the end of the setup time 68 and the start of the setup time 78, a setup time difference $\Delta m_{2,3}$ occurs between the end of the setup time 78 and the start of the setup time 88, and a setup time difference $\Delta m_{3,4}$ occurs between the end of the setup time 88 and the start of the setup time 98, and so forth.

The setup time difference data may be similarly obtained for other artificial jobs (e.g., an artificial job composed of print jobs $j_1$ and $j_2$ in reverse order). As mentioned above, the differences in setup times from one print machine $M_i$ to another print machine $M_{i+1}$ may be determined for ail of the print machines that are scheduled to process the artificial jobs. For instance, FIGS. 4 and 5 represent plots of such data for two respective artificial jobs combining print jobs $j_1$ and $j_2$ in opposite orders of priority.

Figure 4:
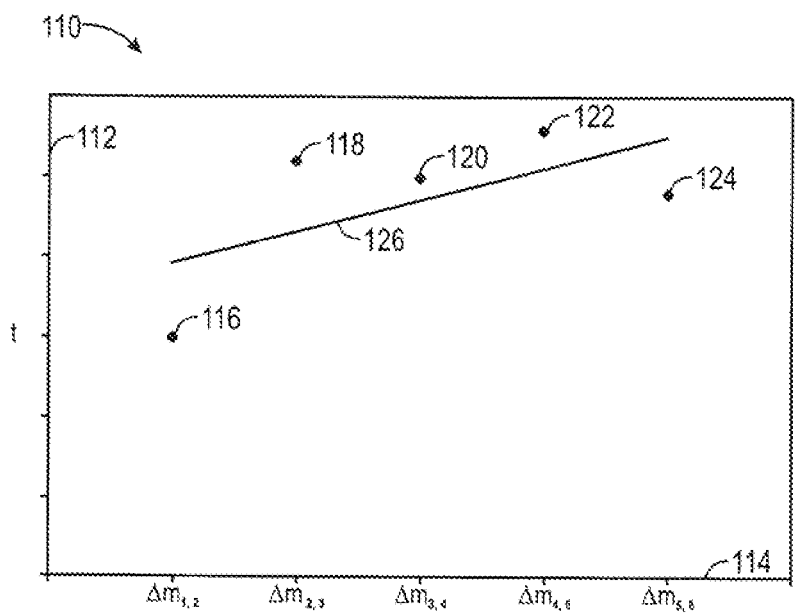
FIG. 4 is a plot modeling setup time differences for an artificial job composed of two jobs prioritized in a first manner, in accordance with an embodiment.

Turning to FIG. 4, a plot 100 includes an ordinate 112 representing time and an abscissa 114 representing the setup time differences for a series of print machines when processing an artificial job in which the print job $j_1$ is prioritized before the print job $j_2$. The plot 110 includes data points 116, 118, 120, 122, and 124, which respectively correspond to expected setup time differences between different sequential print machines. A line 126 represents a best fit line based on these data points. As shown in the plot 110, the best fit line 126 is generally sloping in an upward direction.

Figure 5:
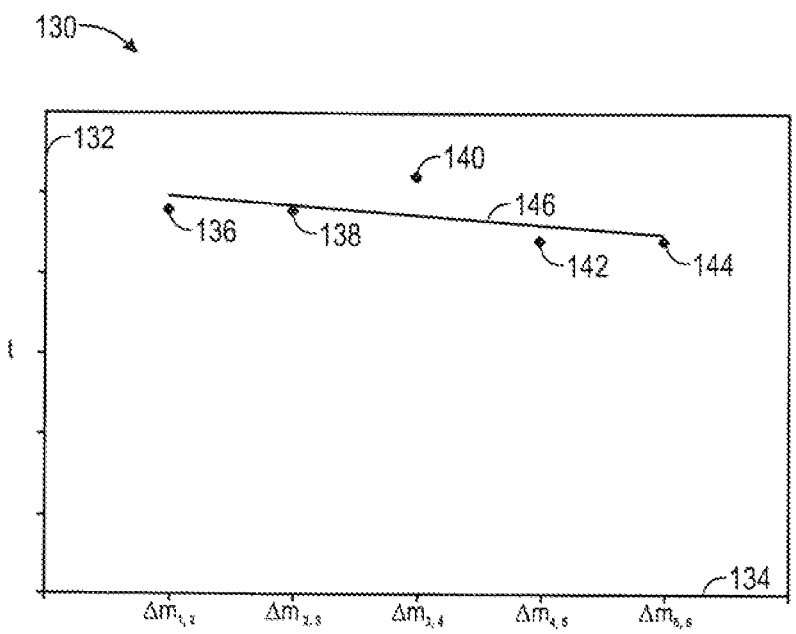
FIG. 5 is a plot modeling setup time differences for an artificial job composed of the two jobs of FIG. 4 prioritized in a second manner, in accordance with an embodiment.

A plot 130 of FIG. 5 represents the setup time differences when the artificial job is prioritized in reverse order—that is, when the print job $j_2$ is prioritized before a print job $j_1$. In the plot 130, an ordinate 132 represents time and an abscissa 134 represents the setup time differences for a series of print machines when processing the artificial job. Data points 136, 138, 140, 142, and 144 represent the expected setup time differences between different sequential print machines. A line 146 represents a best fit line associated with the data points of the plot 130. As can be seen, the line 146 slopes downward slightly.

Comparing the line 126 of FIG. 4 to the line 146 of FIG. 5, it may be seen that the line 126 has a greater slope than the line 146. The difference in best fit line slopes suggests that processing a print job batch 14 in the order of priority of the artificial job represented in FIG. 4 will be more efficient than processing a print job batch 14 in the order of priority of the artificial job represented in FIG. 5. As such, the workflow controller 12 may prioritize the print jobs of the print job batch 14 according to this analysis.

The invention claimed is:

1. A system comprising:
   an input/output port configured to output a print job batch including at least one print job of a first family and at least one print job of a second family to be processed on a plurality of print machines in a workflow, wherein processing the at least one print job of the first family on a first of the plurality of print machines in the workflow after the first of the plurality of print machines in the workflow has processed the at least one print job of the second family involves a first setup time and processing the at least one print job of the second family on the first of the plurality of print machines in the workflow after the first of the plurality of print machines in the workflow has processed the at least one print job of the first family involves a second setup time different from the first setup time, and wherein the at least one print job of the first family and the at least one print job of the second family are prioritized in an order of priority in the print job batch; and a processor configured to determine the order of priority of the print job batch based at least in part on expected trends comprising a first trend of expected differences in setup times between the plurality of print machines in the workflow when the at least one print job of the first family is prioritized before the at least one print job of the second family and a second trend of expected differences in setup times between the plurality of print machines in the workflow when the at least one print job of the second family is prioritized before the at least one print job of the first family, wherein the processor is further configured to determine the expected trends in setup time differences from one successive operation to another were a plurality of artificial jobs comprising the at least one print job of the first family and the at least one print job of the second family processed by print machines of a print service provider, by determining a plurality of vectors associated respectively with the artificial jobs according to a relationship in which setup time differences are associated with successive operations from a first operation to a last operation.

2. The system of claim 1, comprising storage configured to store data indicating setup times associated with the plurality of print machines in the workflow when the at least one print job of the first family is prioritized before the at least one print job of the second family and when the at least one print job of the second family is prioritized before the at least one print job of the first family, wherein the processor is configured to determine the first trend and the second trend based at least in part on the setup times associated with the plurality of print machines in the workflow.

3. The system of claim 1, wherein the processor is configured to determine the order of priority of the print job batch as prioritizing the at least one print job of the first family before the at least one print job of the second family when the first trend generally increases faster than the second trend and as prioritizing the at least one print job of the second family before the at least one print job of the first family when the second trend generally increases faster than the first trend.

4. The system of claim 1, wherein the processor is configured to:
determine the first trend by determining a first best fit line relating data points representative of the differences in setup times between the plurality of print machines in the workflow when the at least one print job of the first family is prioritized before the at least one print job of the second family;
determine the second trend by determining a second best fit line relating data points representative of the differences in setup times between the plurality of print machines in the workflow when the at least one print lob of the second family is prioritized before the at least one print job of the first family; and
determine the order of priority of the print job batch by comparing the first best fit line and the second best fit line.

5. The system of claim 4, wherein the processor is configured to determine the order of priority of the print job batch as prioritizing the at least one print job of the first family before the at least one print job of the second family when the first best fit line has a larger slope than the second best fit line and as prioritizing the at least one print job of the second family before the at least one print job of the first family when the second best fit line has a larger slope than the first best fit line.

6. The system of claim 1, wherein the print job batch is configured to be splittable into separate print jobs between being processed by different of the plurality of print machines in the workflow.

7. The system of claim 1, wherein the first and second trends are based on a plurality of vectors associated respectively with the print job batch.

8. The system of claim 1, wherein the processor is configured to prioritize print jobs of the print job batch based at least in part on the plurality of vectors.

9. The system of claim 8, wherein the processor is configured to prioritize the print jobs of the print job batch by selecting permutation of print job families associated with an artificial job associated with the vector of the plurality of vectors that generally increases the most.

10. A method comprising:
determining, using data processing circuitry, a first artificial job of a plurality of artificial jobs, the first artificial job comprising a first print job and a second print job, wherein the first print job is prioritized as before the second print job in the first artificial job, wherein processing the first print job after the second print job on a plurality of print machines is expected to require different setup times than processing the first print job before the second print job;
determining, using the data processing circuitry, a first plurality of setup time differences between successive operations that would be expected to occur if the first artificial job were processed by the plurality of print machines;
determining, using the data processing circuitry, a first best fit line associated with the first plurality of setup time differences;
determining, using the data processing circuitry, a second artificial job of the plurality of artificial jobs, the second artificial job comprising the first print job and the second print job, wherein the second print job is prioritized as before the first print job in the second artificial job;
determining, using the data processing circuitry, a second plurality of setup time differences between successive operations that would be expected to occur if the second artificial job were processed by the plurality of print machines;
determining, using the data processing circuitry, a second best fit line associated with the second plurality of setup time differences;
determining, using the data processing circuitry, a print job batch configured to be processed by the plurality of print machines and comprising the first print job and the second print job, wherein the first print job is prioritized as before the second print job when the first best fit line has a larger slope than the second best fit line and the second print job is prioritized as before the first print job when the second best fit line has a larger slope than the first best fit line; and
determining, using the data processing circuitry, expected trends in setup time differences from one successive operation to another were the artificial jobs processed by print machines of a print service provider, by determining a plurality of vectors associated with the artificial jobs according to a relationship in which setup time differences are associated with successive operations from a first operation to a last operation.

11. The method of claim 10, wherein the first plurality of setup time differences is determined by simulating, using the data processing circuitry, processing the first artificial job through a computer model of the plurality of print machines and the second plurality of setup time differences is determined by simulating, using the data processing circuitry, processing the second artificial job through the computer model of the plurality of print machines.

12. The method of claim 10, wherein the first plurality of setup time differences and the second plurality of setup differences are determined based at least in part on print machine setup data stored in a database.

13. The method of claim 12, wherein the print machine setup data relates the setup times of the plurality of print machines and an order in which different types of print jobs are processed through the plurality of print machines.

14. The method of claim 10, further comprising determining expected trends in setup time differences based on a plurality of vectors associated respectively with the artificial jobs.

15. The method of claim 14, comprising prioritizing print jobs of the print job batch based at least in part on the plurality of vectors; and
prioritizing the print jobs of the print job batch by selecting a permutation of print job families associated with an artificial job associated with the vector of the plurality of vectors that generally increases the most.

16. An article of manufacture comprising:
at least one tangible, non-transitory machine-readable medium at least collectively comprising instructions executable by a processor, the instructions comprising:
instructions to receive data describing print jobs of a plurality of print job families;
instructions to determine a plurality of artificial jobs that each include the print jobs prioritized in different permutations of print job families;
instructions to determine expected trends in setup time differences from one successive operation to another were the artificial jobs processed by print machines of a print service provider;
instructions to determine a print job batch, wherein the print job batch comprises the print jobs in an order of priority, wherein the order of priority is based at least in part on the expected trends in the setup time differences;
wherein the instructions to determine the expected trends in setup time differences comprise instructions to determine a plurality of vectors associated respectively with the plurality of artificial jobs according to a relationship in which setup time differences are associated with successive operations from a first operation to a last operation.

17. The article of manufacture of claim 16, wherein the instructions to receive the data describing the print jobs of the plurality of print job families comprises instructions to receive the data describing the print jobs of the plurality of print job families, wherein the plurality of print job families comprises three or more print job families.

18. The article of manufacture of claim 16, wherein the relationship is:

$$T_j = (\Delta_1, \Delta_2, \ldots, \Delta_{|M|}),$$

where $\Delta_1, \Delta_2, \ldots, \Delta_{|M|}$ represent the setup times differences associated with the successive operations from the first operation of 1 to the last operation of $_{|M|}$.

19. The article of manufacture of claim 18, comprising instructions to prioritize the print jobs of the print job batch based at least in part on the plurality of vectors.

20. The article of manufacture of claim 18, comprising instructions to prioritize the print jobs of the print job batch by selecting the permutation of print job families associated with the artificial job associated with the vector of the plurality of vectors that generally increases the most.

* * * * *